United States Patent
Katsuyama et al.

(10) Patent No.: US 10,162,501 B2
(45) Date of Patent: Dec. 25, 2018

(54) TERMINAL DEVICE, DISPLAY CONTROL METHOD, AND NON-TRANSITORY COMPUTER-READABLE RECORDING MEDIUM

(71) Applicant: FUJITSU LIMITED, Kawasaki-shi, Kanagawa (JP)

(72) Inventors: Yutaka Katsuyama, Yokohama (JP); Yusuke Uehara, Kawasaki (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 176 days.

(21) Appl. No.: 15/258,107

(22) Filed: Sep. 7, 2016

(65) Prior Publication Data

US 2016/0378312 A1    Dec. 29, 2016

Related U.S. Application Data

(63) Continuation of application No. PCT/JP2014/058283, filed on Mar. 25, 2014.

(51) Int. Cl.
*G06F 17/21* (2006.01)
*G06F 3/0484* (2013.01)
*G06F 3/0485* (2013.01)
*G06F 3/0488* (2013.01)
*G06F 3/0482* (2013.01)

(52) U.S. Cl.
CPC ........ *G06F 3/04845* (2013.01); *G06F 3/0482* (2013.01); *G06F 3/0485* (2013.01); *G06F 3/04842* (2013.01); *G06F 3/04883* (2013.01); *G06F 17/21* (2013.01);
(Continued)

(58) Field of Classification Search
CPC . G06F 2203/04806; G06F 2203/04805; G06F 2203/04803; G06F 3/04845; G06F 3/04886; G06F 3/04842; G06F 3/0485; G06F 3/04883; G06F 17/21; G06F 3/0482; G06K 9/22
See application file for complete search history.

(56) References Cited

U.S. PATENT DOCUMENTS 7,159,172 B1    1/2007  Bentley et al.
2005/0251015 A1  11/2005  Takikawa et al.
(Continued)

FOREIGN PATENT DOCUMENTS

EP    1 215 563 A2    6/2002
JP    6-75736    3/1994
(Continued)

OTHER PUBLICATIONS

Espacenet Bibliographic Data, Japanese Publication No. 2005-311888, published Nov. 4, 2005.
(Continued)

*Primary Examiner* — Robert J Craddock
(74) *Attorney, Agent, or Firm* — Staas & Halsey LLP

(57) ABSTRACT

A terminal device includes a processor that executes a process including extracting multiple character strings, in units of rows, from a character area included in an image data, determining whether a subsequent row succeeding a designated row exists when the designation of a position of one of the multiple character strings in the designated row is released, and enlarging and displaying a character string of a beginning of the subsequent row and the vicinity of the beginning when the subsequent row is determined to exist.

15 Claims, 14 Drawing Sheets

(52) U.S. Cl.
CPC .............. *G06F 2203/04803* (2013.01); *G06F 2203/04805* (2013.01); *G06F 2203/04806* (2013.01)

(56) References Cited

U.S. PATENT DOCUMENTS

2008/0168384 A1   7/2008  Platzer et al.
2016/0378336 A1  12/2016  Katsuyama et al.

FOREIGN PATENT DOCUMENTS

| | | |
|---|---|---|
| JP | 2000-311039 | 11/2000 |
| JP | 2005-311888 | 11/2005 |
| JP | 2009-69888 | 4/2009 |
| JP | 2016-509667 | 3/2014 |
| WO | WO 98/22910 | 5/1998 |
| WO | WO 2004-064033 | 7/2004 |

OTHER PUBLICATIONS

Espacenet Bibliographic Data, Japanese Publication No. 6-75736, published Mar. 18, 1994.
Patent Abstracts of Japan, Publication No. 2000-311039, published Nov. 7, 2000.
Patent Abstracts of Japan, Publication No. 2009-69888, published Apr. 2, 2009.
International Search Report dated Apr. 28, 2014 in corresponding International Application No. PCT/JP2014/058283.
Extended European Search Report dated Feb. 15, 2017 in corresponding European Patent Application No. 14887257.5.
Japanese Office Action dated Jun. 13, 2017 in Application No. 2016-509666.
Chinese Office Action dated Jul. 12, 2018 in Application No. 201480077237.8, 17 pgs.

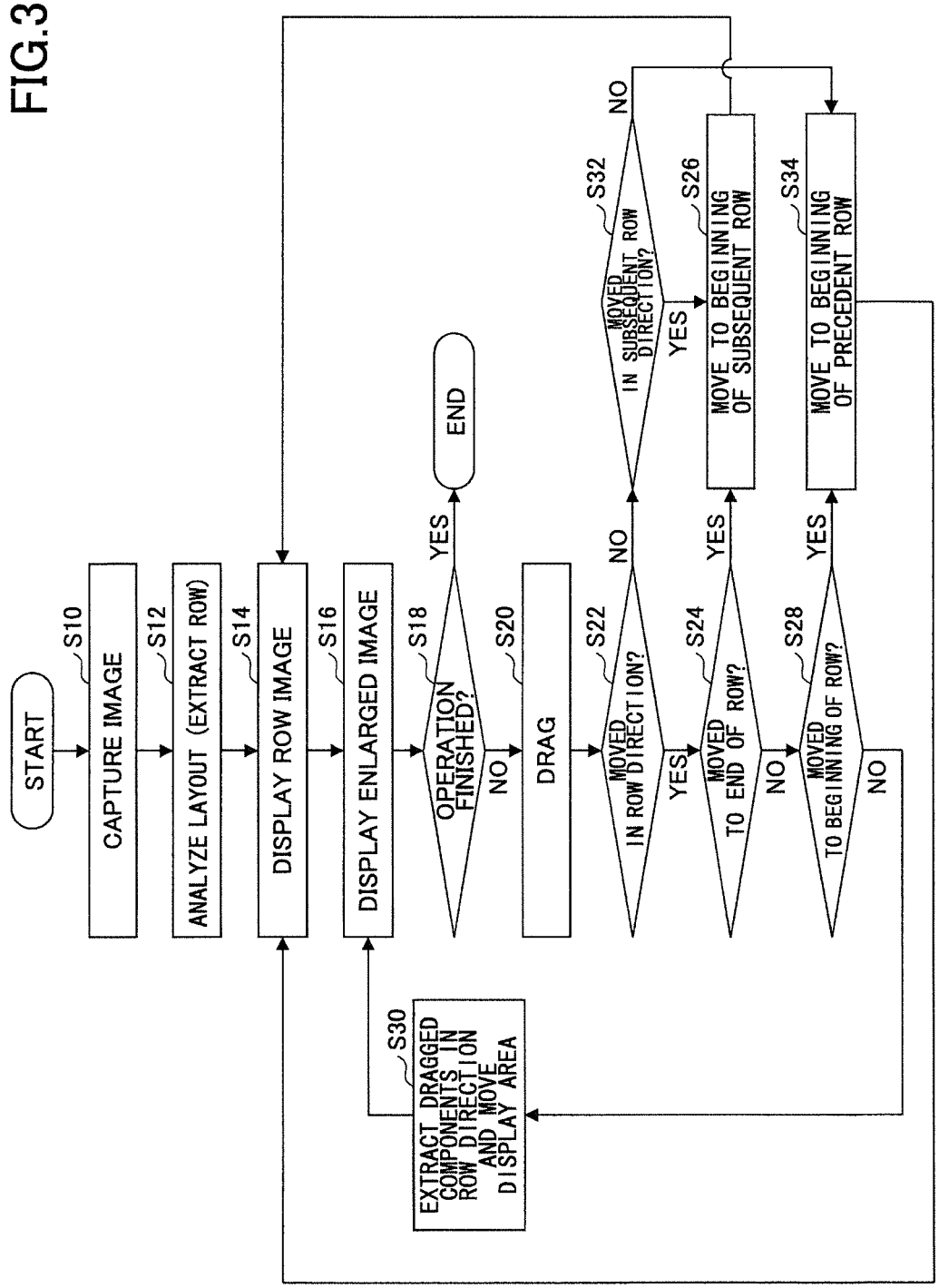

EXTRACT CHARACTER STRING IN ROW UNITS

EXTRACT CHARACTER STRING IN ROW UNITS

CENTER LINE OF CURRENT ROW
SUBSEQUENT ROW

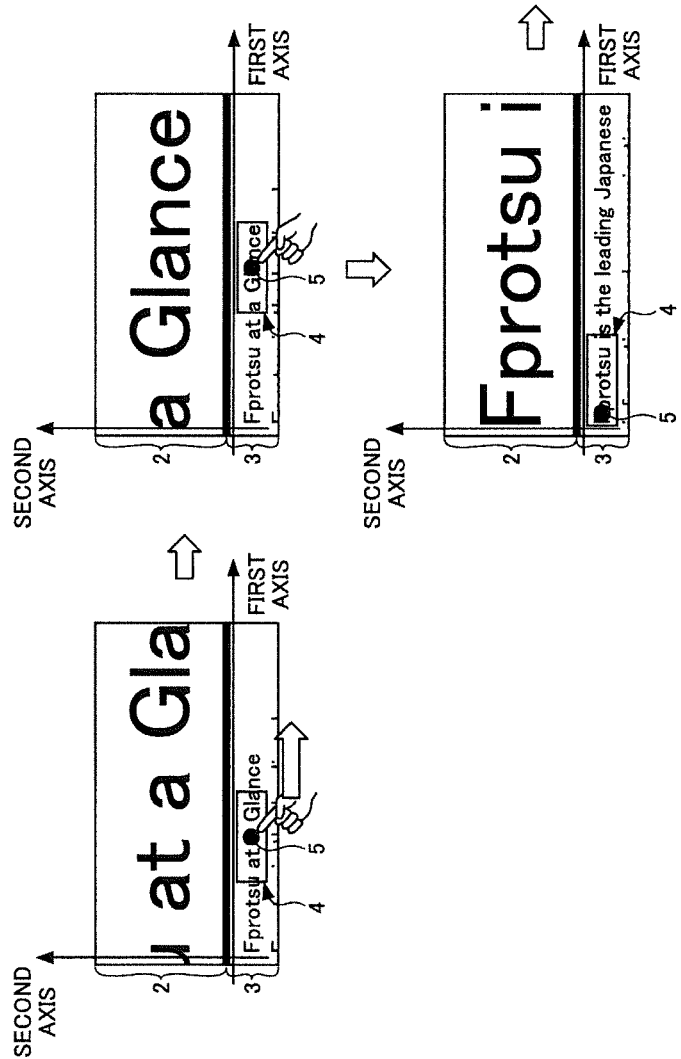
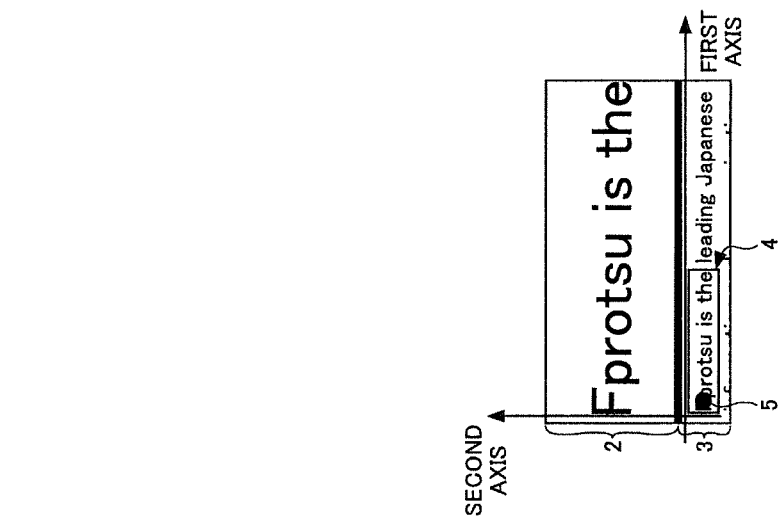
FIG.6D
FIG.6B
FIG.6C
FIG.6A

TERMINAL DEVICE, DISPLAY CONTROL METHOD, AND NON-TRANSITORY COMPUTER-READABLE RECORDING MEDIUM

CROSS-REFERENCE TO RELATED APPLICATIONS

This application is a U.S. continuation application filed under 35 USC 111(a) claiming benefit under 35 USC 120 and 365(c) of PCT application PCT/JP 2014/058283, filed on Mar. 25, 2014. The foregoing applications are hereby incorporated herein by reference.

FIELD

The embodiments discussed herein are related to a terminal device, a display control method, and a non-transitory computer-readable recording medium.

BACKGROUND

People that are farsighted due to old age or people that are weak-sighted may sometimes use reading glasses or magnifying glasses for visually recognizing characters more easily. However, the use of reading glasses or magnifying glasses is troublesome. Further, reading glasses and magnifying glasses are inconvenient to carry.

Owing to the wide use of smartphones in recent years, electronic devices such as smartphones are equipped with a function of a magnifying glass or a reading glass. This character enlarging function can be implemented in the form of, for example, photographing an object with a camera of a smartphone and displaying an enlargement of a predetermined portion of the photographed object.

Further, Patent Document 1 proposes a technique of detecting a target object from an image displayed on a screen (e.g., face of person) and determining an expansion rate and display area for enlarging and displaying the target object. Then, the target object is enlarged and displayed according to the determined expansion rate and display area.

RELATED ART DOCUMENTS

Patent Document 1: Japanese Laid-Open Patent Publication No. 2005-311888

However, in a case of displaying multiple rows of enlarged character strings with the above-described art, there is difficulty in finding the beginning of a row that succeeds a certain row being read when transferring from the end of the certain row to the beginning of the succeeding row. Therefore, the user of an electronic device such as a smartphone needs to move the electronic device many times whenever a row is returned. This maneuver is troublesome and inconvenient for the user.

For example, in a case of using a camera to enlarge and display a target character string of a row of a document of a paper medium while moving the camera along the row, the camera is to be moved along the row of the document. When the end of the row is reached in this situation, the smartphone is to be moved to the subsequent row. However, because the document is being enlarged and displayed, it is difficult to swiftly move the camera to the beginning of an adjacent row.

SUMMARY

According to an aspect of the invention, there is provided a terminal device that includes a processor that executes a process including extracting multiple character strings, in units of rows, from a character area included in an image data, determining whether a subsequent row succeeding a designated row exists when the designation of a position of one of the multiple character strings in the designated row is released, and enlarging and displaying a character string of a beginning of the subsequent row and the vicinity of the beginning when the subsequent row is determined to exist.

The object and advantages of the invention will be realized and attained by means of the elements and combinations particularly pointed out in the claims.

It is to be understood that both the foregoing general description and the followed detailed description are exemplary and explanatory and are not restrictive of the invention, as claimed.

BRIEF DESCRIPTION OF DRAWINGS

FIG. 3 is a flowchart illustrating an example of an enlarged character display process according to the first embodiment;

FIGS. 6A-6D are diagrams illustrating an example of displaying an enlarged character according to the first embodiment;

DESCRIPTION OF EMBODIMENTS

Figure 1:
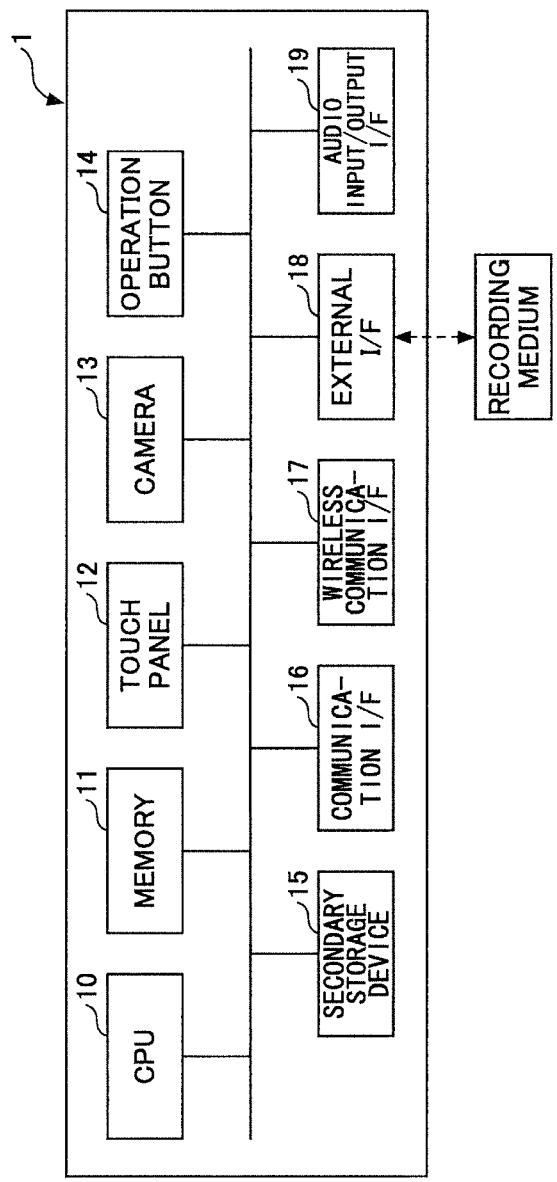
FIG. 1 is a diagram illustrating an example of a hardware configuration of a terminal device according to an embodiment of the present invention.

Next, embodiments of the present invention are described with reference to the accompanying drawings. In the description and drawings, like components having substantially the same function and configuration are denoted with like reference numerals and redundant explanation thereof is omitted.

<Example of Hardware Configuration>

First, an example of a hardware configuration of a terminal device according to an embodiment of the present invention is described. FIG. 1 illustrates an example of a hardware configuration according to an embodiment of the present invention. The terminal device according to an embodiment of the present invention is an electronic device that enlarges and displays characters. Examples of the terminal device are a smartphone, a tablet terminal, a mobile phone, and an electronic book. In the following, a smartphone is described as an example of the terminal device.

A smartphone 1 according to an embodiment of the present invention includes a CPU (Central Processing Unit) 10, a memory 11, a touch panel 12, a camera 13, an operation button 14, a secondary storage device 15, a communication I/F (interface) 16, a wireless communication I/F 17, an external I/F 18, and an audio input/output I/F 19.

The CPU 10 controls the entire parts included in the smartphone 1. The functions of the smartphone 1 are implemented by reading out a program stored in the memory 11 (e.g., ROM (Read Only Memory), RAM (Random Access Memory)) and executing the program.

For example, the CPU 10 sequentially obtains and decrypts instructions of an application program and performs, for example, execution of the contents of the application, calculation, data transfer, and controls. The CPU 10 according to an embodiment of the present invention reads out an enlarged character display program and other programs/data from the memory 11 or the secondary storage device 15 and executes an enlarged character display process. Thereby, the CPU 10 performs the overall controls of the smartphone 1 and executes an enlarged character display control function installed in the smartphone 1.

The touch panel 12 includes a sensor that can detect a user's finger or an operation device (e.g., a stylus pen) contacting a touch surface of the touch panel 12. The touch panel 12 has a function of enabling data to be input according to the user's operation performed on the touch panel 12. Further, the touch panel 12 has a function of displaying a desired object on a display (e.g., LCD (Liquid Crystal Display)). The touch panel 12 according to an embodiment of the present invention displays an enlarged view of a character string designated in accordance with the user's finger contacting the touch surface of the touch panel 12. The sensor of the touch panel 12 may be, for example, a pressure sensor, a capacitive sensor, or an optical sensor. It is, however, to be noted that any sensor may be used as the sensor of the touch panel 12 as long as the sensor can detect contact and non-contact between the operation device and the touch surface.

The camera 13 includes a lens an imaging device. The camera 13 captures an image of a printed material or document pertaining to an object and obtains data of the image. The operation button 14 is a button provided for executing a predetermined function of the smartphone 1. The operation button 14 may be, for example, a power button for switching on/off the power of the smartphone 1 or a button for returning to a previously displayed image (hereinafter also referred to as "return button").

The secondary storage device 15 may be a storage device such as an EEPROM (Electrically Erasable Programmable Read Only Memory), a flash memory, or an HDD (Hard Disk Drive). The secondary storage device 15 stores, for example, programs executed by the CPU 10 (e.g., control program, OS program) and application programs for enabling the CPU 10 to execute various functions of the smartphone 1.

The communication I/F 16 is an interface for enabling the smartphone to communicate with external devices via a communication network. The communication I/F 16 implements data transmission/reception between the smartphone 1 and various communication devices by connecting the smartphone 1 to the various communication devices via the communication network. Further, the communication I/F 16 may also function as an interface for transmitting/receiving data (e.g., e-mail data) between the smartphone 1 and another device via a mobile phone network.

The wireless I/F 17 is an interface for performing wireless communication between the smartphone 1 and an external device. The wireless I/F 17 may be, for example, an interface for implement any one of infrared communication (e.g., IrDA, Irss), a Bluetooth (Registered Trademark) communication, Wi-Fi (Registered Trademark) communication, and non-contact type IC card communication.

The external I/F 18 is an interface for connecting an external device to the smartphone 1. The external I/F may be, for example, a socket for inserting an external recording medium (e.g., memory card) therein, inserting an HDMI (High Definition Multimedia Interface, Registered Trademark), or inserting a USB (Universal Serial Bus) terminal. In this case, the CPU 10 performs data transmission/reception between the mobile phone 1 and the external device via the external I/F 18.

The audio input/output interface 19 is an interface for outputting audio data processed by the smartphone 1. The outputting of audio data may be implemented by, for example, a speaker, a headphone terminal, and a headphone. Further, the audio input/output interface 19 is an interface for inputting audio created outside the smartphone 1. The inputting of audio may be implemented by, for example, a microphone.

<Example of Functional Configuration>

Figure 2:
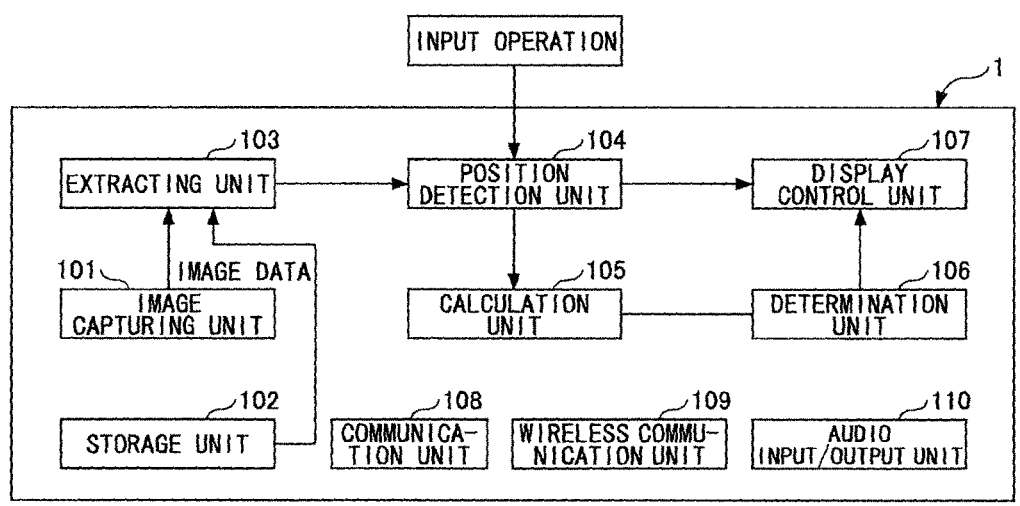
FIG. 2 is a diagram illustrating an example of a functional configuration of the terminal device according to an embodiment of the present invention.

Next, a configuration of the functions included in the terminal device 1 according to an embodiment of the present invention is described with reference to FIG. 2. FIG. 2 illustrates the functions of the terminal device 1 according to an embodiment of the present invention. The functions of the terminal device 1 are described by using the smartphone 1 as an example.

The smartphone 1 according to an embodiment of the present invention includes an image capturing unit 101, a storage unit 102, an extracting unit 103, a position detection unit 104, a calculation unit 105, a determination unit 106, a display control unit 107, a communication unit 108, a wireless communication unit 109, and an audio input/output unit 110.

The image capturing unit 101 obtains image data of a captured document or the like. The image capturing unit 101 may be implemented by, for example, the camera 13.

The storage unit 102 stores the obtained image data, various programs, and various data therein. A first threshold value and a second threshold value that are set beforehand (described below) are stored in the storage unit 102. The storage unit 102 may be implemented by, for example, the memory 11 or the secondary storage device 15.

The extracting unit 103 extracts a character string(s) from a character area included in image data. The extracting unit 103 extracts the character string(s) in units of rows.

The position detection unit 104 detects the operation device (e.g., finger, stylus) contacting the touch surface or the operation device being released from touch surface. The position detection unit 104 may be implemented by, for example, the sensor mounted to the touch panel 12.

The calculation unit 105 calculates the coordinates (x, y) of the position touched with the operation device based on the detected contact against the touch surface. Further, the calculation unit 105 calculates the direction of movement of the operation device and the distance of the movement of the operation device.

The determination unit 106 determines whether a row succeeds a designated row according to a position touched with the operation device.

Among the character strings extracted in units of rows, the display control unit 107 displays an enlarged view of a character string located at a touch position in a row designated with the operation device and a character string located in the vicinity of the touch position. In a predetermined case explained below, the display control unit 107 displays an enlarged view of a character string located at a beginning of a subsequent row, an enlarged view of a character string located at a beginning of a precedent row, and a character string located in the vicinity of the beginning of the subsequent row and the vicinity of the beginning of the precedent row. The functions of the calculation unit 105, the determination unit 106, and the display control unit 107 are implemented by the CPU 10.

The communication unit 108 performs transmission and reception with respect to an external device.

Hence, the software and hardware configurations of the smartphone 1 are examples of the software and hardware configurations of the terminal device according to an embodiment of the present invention. Next, enlarged character display processes according to the first to third embodiments of the present invention are described in order.

First Embodiment

[Operation of Smartphone (Enlarged Character Display Process]

An example of an enlarged character display process executed by the smartphone 1 of the first embodiment is described with reference to FIG. 3. FIG. 3 is a flowchart illustrating the example of the enlarged character display process of the first embodiment.

In a case where a character string included in image data is oriented ±45 degrees less with respect to a horizontal direction of a screen, the character string is determined to be horizontally written. The horizontal direction (lateral direction) of the screen is assumed to be a first axis whereas the vertical direction (longitudinal direction) of the screen is assumed to be a second axis. In a case where a character string included in image data is oriented ±45 degree less with respect to a vertical direction of a screen, the character string is determined to be vertically written. The vertical direction (longitudinal direction) of the screen is assumed to be a first axis whereas the horizontal direction (lateral direction) of the screen is assumed to be a second axis. The following description illustrates a case where the character string is horizontal direction in which the horizontal direction of the screen is assumed to the first axis (row direction) whereas the vertical direction of the screen is assumed to be the second axis.

Figure 4B:
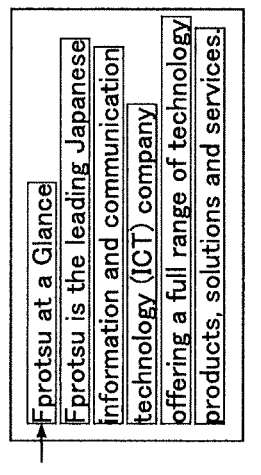
FIGS. 4A-4C are diagrams for explaining the extracting of a character string (English) in units of lines according to an embodiment of the present invention.
Figure 4A:
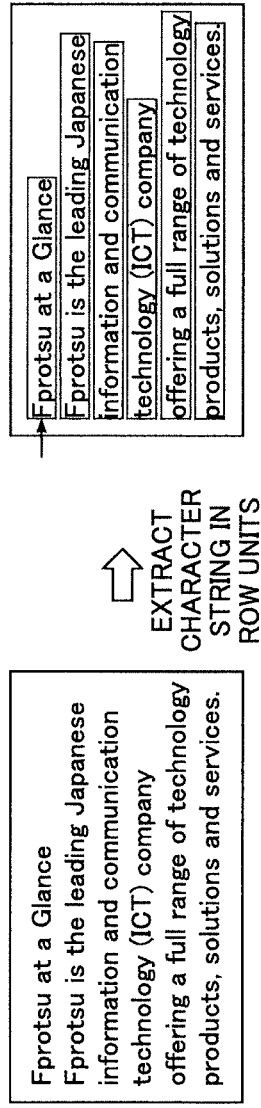
Figures 5A, 5B, 5C:
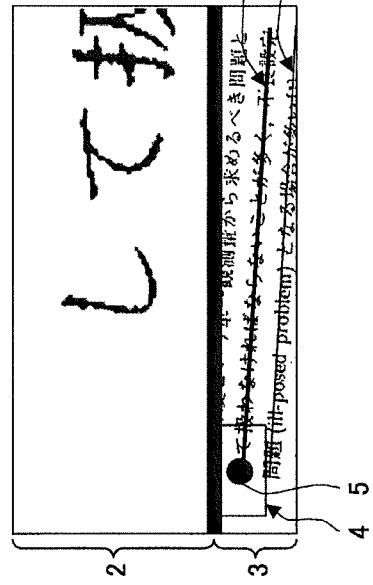
FIGS. 5A-5C are diagrams for explaining the extracting of a character string (Japanese) in units of lines according to an embodiment of the present invention.

When the enlarged character display process of the first embodiment is started, the image capturing unit 101 captures an image of a document or the like and loads data of the captured image which including characters of the document into the smartphone 1 (Step S10). FIG. 4A illustrates an example of image data obtained by the smartphone 1 by photographing an English document printed on a paper medium whereas FIG. 5A illustrates an example of image data.

Next, the extracting unit 103 analyzes the layout of the obtained image data and extracts a character string, in units of rows, from a character area included in the image data (Step S12). For example, the extracting unit 13 analyzes the layout of the image data by using OCR (Optical Character Recognition) technology and extracts character strings in the row direction. The extracting unit 13 extracts the character strings in units of rows. The extracting unit 13 does not extract characters from a single row but extracts characters from multiple rows. The order of the rows are decided according to the positional relationship of the rows. Even in a case where the image data includes a combination of graphs and character strings, the graphs and character strings can automatically be separated by performing the layout analyzing process. Thereby, only character strings can be extracted in units of rows. FIG. 4B and FIG. 5B illustrate examples in which character strings are extracted, in units of rows, from image data. The character strings provided in respective frames represent the character strings extracted in units of rows. The extracting unit 13 obtains the size of the characters and the space between the characters and estimates the direction of a row (vertically written or horizontally written) based on character size and character space. The extracting unit 13 extracts a center line of a row and the coordinates of two end points provided at the ends of the center line based on the estimated direction of the row.

Note that the image data on which the layout analysis is performed by the extracting part 103 does not necessarily need to be image data photographed by the image capturing unit 10. Alternatively, the layout analysis may also be performed on image data stored in, for example, the smartphone 1. In Step S10 of this case, image data is read out from the secondary storage 15 instead of using the photographed image.

In a case where the user designates a row by touching the touch surface, the display control unit 107 displays the designated row according to the touch position (Step 14).

Figure 4C:
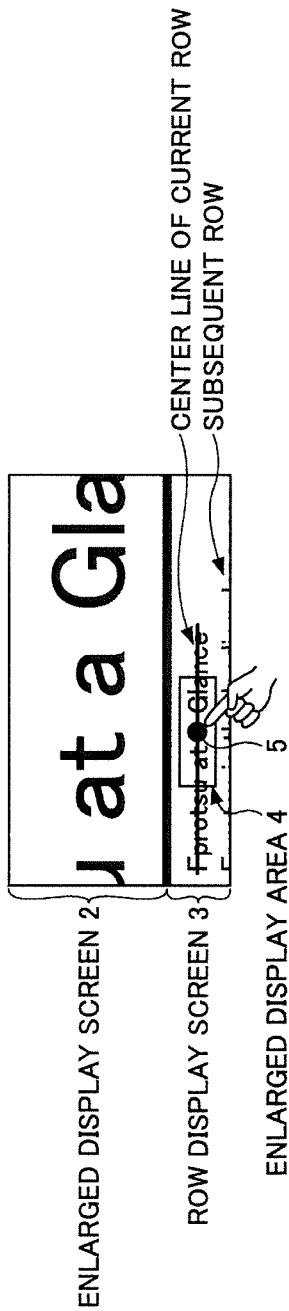

Examples of the screen of the touch panel 12 are illustrated in FIG. 4C and FIG. 5C. In each of these examples, the screen of the touch panel 12 is divided into two sections, that is, an upper section and a lower section. A portion of image data provided about a designated row is displayed in a row display screen 3. More specifically, a center line of a currently designated row, a portion of a subsequent row (and/or a precedent row), an area of a character string that is to be enlarged and displayed on an enlarged display screen 2 (enlarged display area 4), and a drag button 5 are displayed in the row display screen 3.

When the drag button 5 is touched and operated by way of a user's finger, the display control unit 107 displays an enlarged view of a character string of a designated position of a designated row and a character string located in the vicinity of the designated position of the designated row (Step S16). In the following description, an operation in which the user touches the drag button 5 displayed on the row display screen 3 with the his/her finger and an operation in which the user moves the drag button 5 while touching the drag button 5 with his/her finger may also be hereinafter to as "dragging".

For example, a character string of the enlarged view area 4 of the row display screen 3 is displayed in the enlarged display screen 2 as illustrated in FIG. 4C and FIG. 5C. That is, an enlarged character string of a designated position and the vicinity of the designated position is displayed.

Then, the determination unit 106 determines whether a completion action is executed (Step S18). For example, the determination unit 106 determines whether the completion action is executed when the user presses a return button (not illustrated). In a case where the determination unit 106 determines that the completion action is executed. This process is terminated. In a case where the return button is not pressed, the determination unit 106 determines that the completion action is not yet executed, and the position detection unit 104 detects movement (touch position) of the position of the drag button 5 in accordance with the drag operation by the user (Step S20).

The determination unit 106 determines whether the drag button 5 is moving in the row direction based on the detected position of the drag button 5 (Step S22). In a case where the determination unit 106 determines that the drag button 5 is moving in the row direction, the determination unit 106 determines whether the drag button has moved to the end of the designated row (Step S24). In this case, the determination unit 106 determines whether the drag button has moved at the end of the row based on the coordinates of the two end points of the extracted center line of the designated row.

In a case where the determination unit 106 determines that the drag button 5 has not moved to the end of the row in Step S24, the determination unit 106 determines whether the drag button 5 has moved to the beginning of the designated row (Step S28). In this case, the determination unit 106 determines whether the drag button 5 has moved to the beginning of the row based on the coordinates of the two end points of the extracted center line of the designated row. In a case where the determination unit 106 determines that the drag button 5 has not moved to the beginning of the designated row, the display control unit 107 extracts a component(s) of the row direction at the time when the drag button 5 is moved by the user's finger. The display area of the character string, that is to be displayed on the enlarged display screen 2, is moved by the display control unit 107. The display control unit 107 moves the display area of the character string along the center line of the designated row in the quantity of the extracted components in the row direction (Step S30).

For example, in FIG. 6A, the drag button 5 is displayed slightly in front of the center of the row display screen 3. In this state, the user moves the drag button 5 from left to right in the row direction. In correspondence with the movement of the drag button 5, the enlarged character string displayed in the enlarged display screen 2 moves from the enlarged display screen 4 illustrated in FIG. 6A to the enlarged display area 4 illustrated in FIG. 6B.

Returning to the description of FIG. 3, the display control unit 107 displays an enlarged character string in the position of the moved drag button 5 and the vicinity of the position of the drag button 5 (enlarged display area 4) (Step S16). Then, the determination unit 106 again determines whether the completion action is executed (Step S18). In a case where the return button is not pressed, the position detection unit 105 again detects the coordinates of the position of the drag button 5 (touch position) (Step S20).

Then, the determination unit 106 determines whether the drag button 5 is moving in the row direction based on the detected position of the drag button 5 (Step S22).

In a case where the drag button 5 is clearly moving in a direction orthogonal to the row direction, such as a case where the position of the drag button 5 is being moved in the second axis direction of FIG. 6, the determination unit 106 may determine that the drag button 5 is not moving in the row direction. In a case where the drag button is moving in a direction besides the direction orthogonal to the row direction, the determination unit 106 may determine that the drag button 5 is moving in the row direction. In the case where the determination unit 106 determines that the drag button 5 has moved in the row direction, the drag button 5 is moved in the amount of the components of the first axis (i.e., components in the row direction) when the quantity of movement of the drag button 5 is divided into components of the first axis and components of the second axis. Thereby, the character string to be enlarged and displayed can be defined. That is, the display control unit 107 moves the drag button 5 in the row display screen 3 only in the quantity of the components of the first axis along the center line of a designated row. Thus, the character string is enlarged and displayed in the enlarged display screen 2 in accordance with the movement of the drag button 5. Thereby, the user can enlarge a character string of a designated row in the row direction and easily read the character string without having to accurately trace the drag button 5 on the center line of the designated row.

Note that the same applies in a case of vertical writing. Thus, the display control unit 107 moves the drag button 5 in the quantity of the components of the first axis (perpendicular direction (vertical direction) of screen) when the quantity of movement of the drag button 5 is divided into components of the first axis and components of the second axis. Thereby, the user can enlarge a character string of a designated row in the row direction and easily read the character string.

In a case where the determination unit 106 determines that the drag button 5 is not moving in the row direction in Step S22, the determination unit 106 determines whether the drag button 5 is moving in a direction of a row succeeding the designated row (Step S32). For example, the determination unit 106 may determine that the drag button 5 is not moving in the row direction in a case where the drag button 5 is moving in a perpendicular direction of a screen or a case where the direction in which the drag button is moved is less than ±degrees with respect to the perpendicular direction of the screen. In a case where the determination unit 106 determines that the drag button 5 is moving in the direction of the succeeding row in Step S32, the display control unit 107 moves the beginning of the display position of the screen to the beginning of the succeeding row (Step S26), so that the succeeding row is displayed in the row display screen 3 (Step S14) and the beginning of the succeeding row is displayed in the enlarged display screen 2 (Step S16). As a result, the succeeding row is displayed in the row display screen 3 and the enlarged display area 4 of the row display screen 3 is displayed in the enlarged display screen 2 as illustrated in FIG. 6C. That is, a character string of the beginning of the succeeding row and the vicinity of the beginning of the succeeding row is displayed.

On the other hand, in a case where the determination unit 106 determines that the drag button 5 has not moved in the direction of the succeeding row in Step S32, the display control unit 107 moves the beginning of the display position of the screen to the beginning of a preceding row (Step S26), so that the preceding row is displayed in the row display screen 3 (Step S14) and the beginning of the preceding row is displayed in the enlarged display screen 2 (Step S16).

The following describes a case where the drag button 5 is determined to move in the row direction in Step S22 and determined to move to the end of the designated row in Step S24 based on the detected position of the drag button 5 when the completion action is not executed. This is a case where the drag button 5 is moved to the end of the row as illustrated in, for example, FIG. 6A. In this case, the process proceeds to Step S26 in which the display control unit 107 moves the beginning of the display position of the screen, so that the succeeding row is displayed in the row display screen 3 (Step S14) and the beginning of the succeeding row is displayed in the enlarged display screen 2 (Step S16). Thereby, the enlarged display position can be surely moved to the beginning of the succeeding row by automatically moving the drag button 5 to the succeeding row. Thus, the user can enlarge the succeeding row of the designated row and easily read the succeeding row.

Next, the following describes a case where the drag button 5 is determined to move in the row direction in Step S22 and determined to move to the beginning of the designated row (rather than the end of the designated row) in Steps S24 and S28 based on the detected position of the drag button 5 in Step S20. This is a case where the drag button 5 is moved in a direction opposite of the arrow of FIG. 6A to reach the beginning of the row as illustrated in, for example, FIG. 6A. In this case, the process proceeds to Step S34 in which the display control unit 107 moves the beginning of the display position of the screen to the beginning of the preceding row, so that the preceding row is displayed in the row display screen 3 (Step S14) and the beginning of the preceding row is displayed in the enlarged display screen (Step S16). Thereby, the enlarged display position can be surely moved to the beginning of the preceding row by automatically moving the drag button 5 to the preceding row. Thus, the user can enlarge the preceding row of the designated row and easily read the preceding row.

As described above, at least the processes of Step S22 to S34 are repeatedly executed according to the position of the drag button detected in Step S20. As a result, the entire character string of the designated row is displayed in the row display screen 3 in Step S14. In addition, the character string of the designated position in the designated row and the vicinity of the designated position can be enlarged and displayed in Step S16. Accordingly, the user can enlarge the designated row and easily read the designated row. The foregoing description illustrates an example of the first embodiment of the enlarged character display process executed by the smartphone 1.

[Example of Effects]

Designating a position in a screen by performing a touch operation or the like on the screen can be less precise compared to designating the position in the screen by using a mouse. Therefore, in a case of attempting to enlarge a certain character area by performing a touch operation on the screen not only may enlarge a portion of the characters desired to be enlarged but may also enlarge a portion surrounding the characters.

However, with the enlarged character display process according to the first embodiment, designation of a part to be enlarged and displayed can be easily performed in a case of enlarging a given character area. More specifically, with the first embodiment, a character string can be extracted in, units of rows, from a character area included in image data by layout analysis of a document. Then, a center line of an extracted row and two end points of the center line are calculated, so that a process of moving an enlarged display area along the center line is executed. Accordingly, even in a case where the character area to be enlarged is inaccurate due to shaking of an operating finger, a designated position of a designated row can be steadily enlarged and displayed by simply moving the finger in the row direction of the row display screen 3.

Further, with the enlarged character display process of the first embodiment, the beginning of the succeeding row is automatically enlarged and displayed after the reading of one row is completed. The same applies to a case of returning to a preceding row. Therefore, the user need not search the screen for the beginning of the succeeding or preceding row. From this aspect also, designation of a part to be enlarged and displayed can be easily performed in a case of enlarging a given character area.

Further, with the enlarged character display process of the first embodiment, the character string of an area desired to be enlarged can be displayed at high speed and without error. For example, in a case of enlarging and displaying a character code in a screen by performing character recognition on a printed paper medium by way of OCR, erroneous character recognition may occur in the area desired to be enlarged. Thus, displaying enlarged characters with 100% accuracy and no error is difficult. Further, in a case of performing character recognition by OCR, long process time is required for performing character recognition in two phases including extracting a character string in a row from image data and recognizing each character of the extracted character string of the row. However, with the enlarged character display process of the first embodiment, character recognition is performed in units of rows and is not performed in units of characters of the row of the position desired to be enlarged. Therefore, the characters of the position desired to be enlarged can be enlarged and displayed in units of rows without error. Further, with the enlarged character display process of the first embodiment, processing can be shortened compared to executing an enlarged character display process in units of characters owing to the enlarged character display process being executed in units of rows. Therefore, the processes of enlarging and displaying can be performed at high speed. Accordingly, the response time of enlarging and displaying a designated character string can be reduced. Thus, even in a case where the user is a weak-sighted person or a far-sighted person due to age, the user can smoothly read a document by using the smartphone 1.

[Displaying in Units of Words]

In a case of a language having spaces in-between words such as the English language, the controlling of the enlarged display process can be performed on words of a designated row (i.e., in units of words). In this case, a character string of a designated position and the vicinity of the designated position is enlarged and displayed in units of words. More specifically, the display control unit 107 may enlarge and display an entire succeeding word when the position of the drag button 5 is moved more toward the succeeding word than a middle point between a center position of a preceding word and a center position of the succeeding word.

Accordingly, an enlarged character string can be displayed in units of words as illustrated in FIG. 6D. Thereby, a single word is prevented from being displayed in an intermitted state as illustrated in FIG. 6C. Therefore, the user can enlarge and display a character string in an easily recognizable state. As a result, an enlargement rate of display may become small depending on the word. For example, in a case of displaying a long word, the long word is displayed in a manner in which the enlargement rate of the long word is lower than the enlargement rate of a short word, so that the long word can be displayed within the screen. Therefore, a character string can be displayed in a more recognizable state because a single word is prevented from being displayed in an intermitted state.

Second Embodiment

[Operation of Smartphone (Enlarged Character Display Process]

Figure 7:
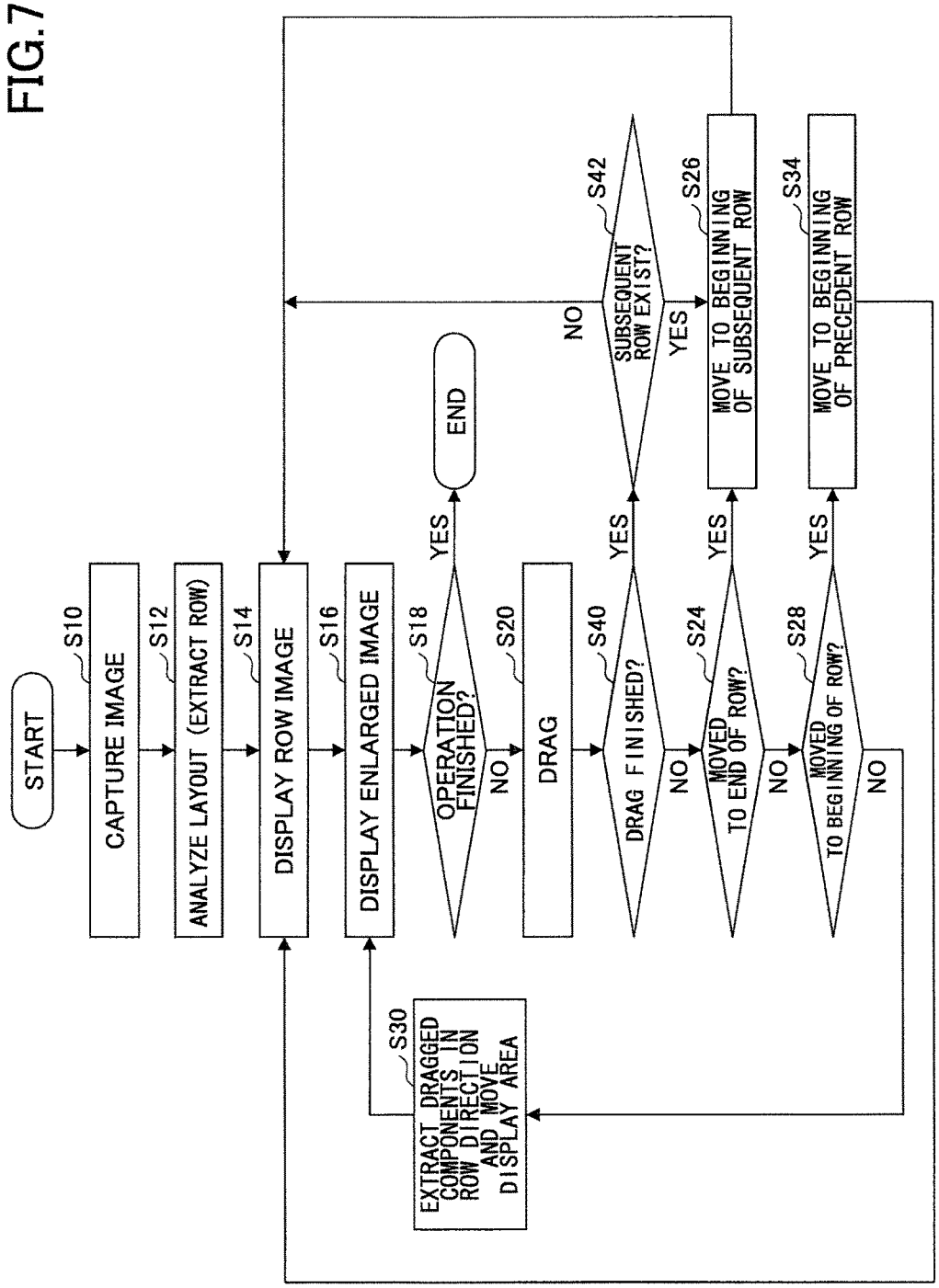
FIG. 7 is a flowchart illustrating an example of an enlarged character display process according to the second embodiment.

Next, an example of an enlarged character display process executed by the smartphone 1 of the second embodiment is described with reference to FIG. 7. FIG. 7 is a flowchart illustrating the example of the enlarged character display process of the second embodiment. Among the steps illustrated in FIG. 7, the steps that are the same as the steps of the enlarged character display process of the first embodiment illustrated in FIG. 7 are indicated with the same step numbers used in FIG. 3. Accordingly, the following description explains the enlarged character display process of the second embodiment, mainly, the steps of the enlarged character display process that are indicated with step numbers different from those of FIG. 3. Thus, redundant description of the first embodiment is omitted.

When the enlarged character display process of the second embodiment is started, an image is captured. Then, character strings are extracted in units of rows by analyzing the layout of data of the image, a character string of a designated row is displayed, and an enlarged character string of the vicinity of a designated position is displayed (Steps S10 to S16). Further, during a period when the operation button is not pressed (Step S18), the position detection unit 104 detects the coordinates of the position of the drag button 5 (touch position) (Step S20).

Figure 8D:
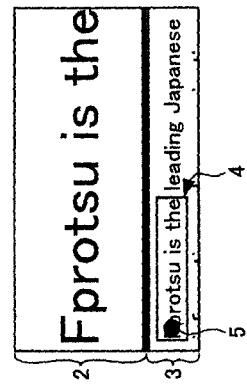
FIGS. 8A-8D are diagrams illustrating an example of displaying an enlarged character according to the second embodiment.
Figure 8B:
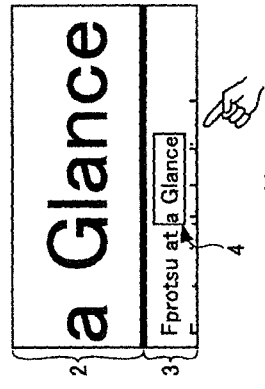
Figure 8C:
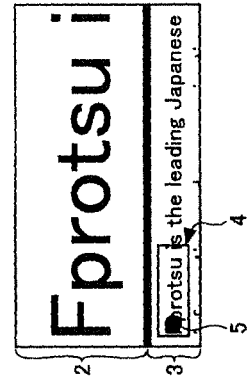
Figure 8A:
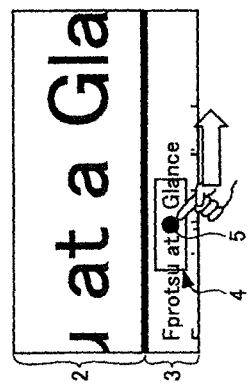

Then, the determination unit 106 determines whether the drag operation is finished based on the detected position of the drag button 5 (Step S40). In a case where the drag operation is finished, the determination unit 106 determines whether a subsequent row succeeding the designated row exists (Step S42). In a case where the subsequent row exists, the display control unit 107 moves the beginning of the display position in the screen to the beginning of the subsequent row (Step S26), displays the subsequent row in the row display screen 3 (Step S14), and displays the beginning of the subsequent row in the enlarged display screen 2 (Step S16). For example, in a case where a finger is released from the drag button 5 as illustrated in FIG. 8B, the subsequent row is automatically displayed in the row display screen 3 and the character string of the beginning of the subsequent row and the vicinity of the beginning of the subsequent row is automatically displayed in the enlarged display screen 2 as illustrated in FIG. 8C.

In a case where the operating finger is determined to have moved to the end or the beginning of the row (Steps S24 and S28), the processes of automatically displaying an enlarged character string of the beginning of the subsequent or precedent row (Steps S26, S34, S16, and S18) are the same as the processes performed in the first embodiment. Further, the processes of moving the displayed enlarged character string according to the movement of the operating finger (Steps S30, S16, and S18) are the same as the processes performed in the first embodiment. Thus, further explanation of these processes is omitted. Hence, the example of an enlarged character display process executed by the smartphone 1 of the second embodiment has been described.

Note that, in a case where a subsequent row succeeding a designated row is determined to exist, the determination unit 106 may determine whether a position that is designated after the release of a designated position is within a predetermined range from the beginning of the subsequent row assuming that the position of the designated position is divided into the first axis indicating the row direction and the second axis being orthogonal to the first axis. In a case where the determination unit 106 determines the designated position is within the predetermined range from the beginning of the subsequent row, the display control unit 107 may enlarge and display a character string of the beginning of the subsequent row and the vicinity of the beginning of the subsequent row.

[Example of Effects]

Designating a position in a screen by performing a touch operation or the like on the screen can be less accurate compared to designating the position in the screen by using a mouse. Therefore, in a case of attempting to enlarge a subsequent row after enlarging a certain row, the designating of the beginning of the subsequent row may be difficult. Particularly, designating the beginning of an enlarged subsequent row is difficult in a situation where the space in-between rows is narrow. When a designating user's finger touches a position above or below the subsequent row in this situation, a character area of a row deviating from the beginning of the subsequent row may be enlarged and displayed. Thus, enlarging a character string of a desired row may be difficult, and a document may be prevented from being smoothly read with the smartphone 1.

In contrast, with the enlarged character display process of the second embodiment, the beginning of an adjacent row can be easily designated when enlarging and displaying a character string.

More specifically, with the enlarged character display process of the second embodiment, a character string can be extracted in, units of rows, from a character area of a screen. Then, it is determined which row corresponds to the area designated to be enlarged by the user. In the case where the designation of a row is determined to be finished, the character string to be enlarged and displayed next can be determined starting from the subsequent row without having to move the position to be enlarged by way of the user's finger.

That is, in the second embodiment, the character string to be enlarged and displayed is controlled to automatically move to the beginning of a subsequent row or a precedent row of the character string when the operating finger is released from the screen. Thereby, the user does not need to search the beginning of a desired row in the screen or designate the beginning of the desired row by touching the screen.

Further, the second embodiment can also attain the same effects attained by the first embodiment described above.

Note that the operation of releasing a position is not limited to an operation of releasing the finger from the screen. For example, in a case of moving the finger in an opposite direction with respect to the moving direction, the designated position is determined to be released. Thus, similar to the above-described releasing of the finger from the screen, the character string to be enlarged and displayed is automatically moved to the beginning of the subsequent row.

[Displaying in Units of Words]

Similar to the first embodiment, the display control unit 107 may enlarge and display a character string of a designated position and the vicinity of the designated position in units of words. Accordingly, as a finger is being moved along the row direction, an enlarged character string is displayed in the enlarged display screen 2 in units of words. For example, a character string is enlarged and displayed in units of pixels in the enlarged display screen 2 as illustrated in FIG. 8C whereas a character string is enlarged and displayed in units of words as illustrated in FIG. 8D. Therefore, a character string can be displayed in a more recognizable state because a single word is prevented from being displayed in an intermitted state.

Third Embodiment

[Operation of Smartphone (Enlarged Character Display Process]

Figure 9:
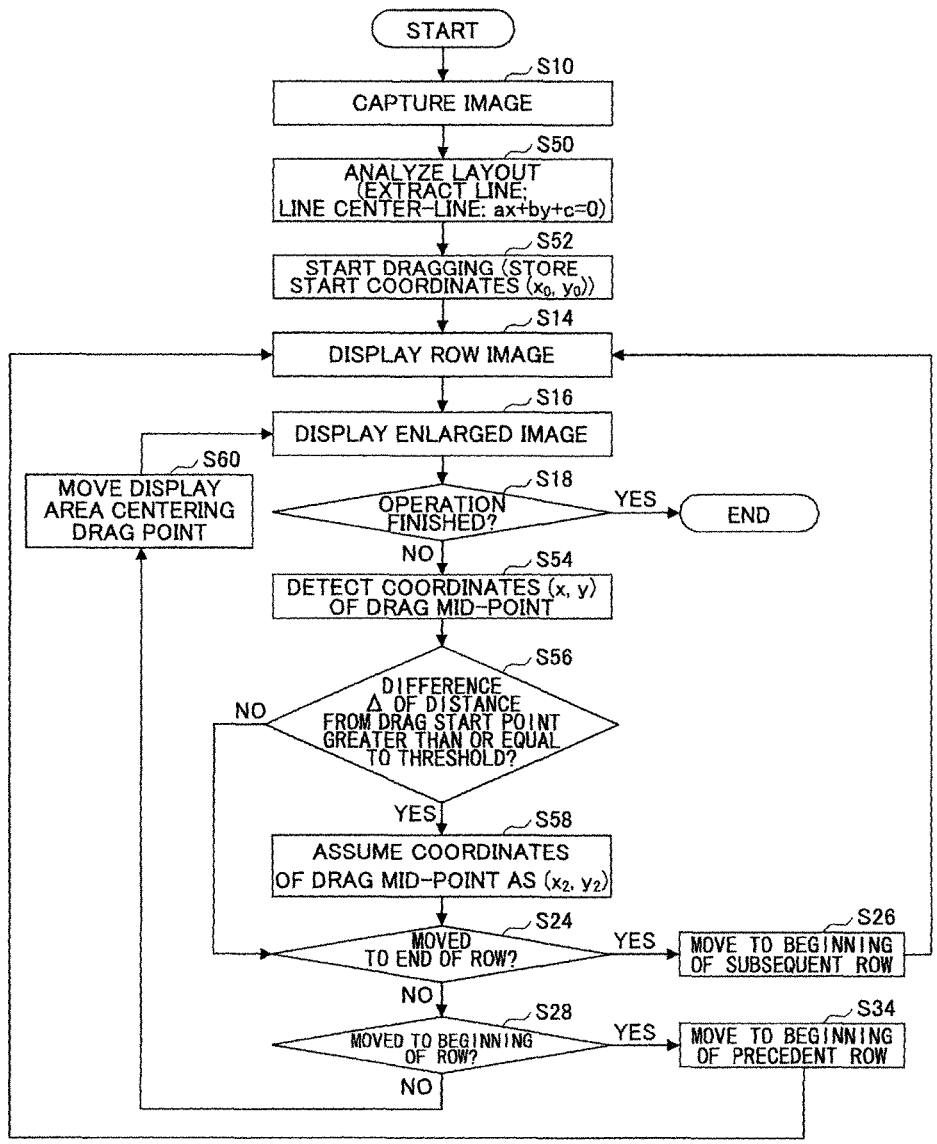
FIG. 9 is a flowchart illustrating an example of an enlarged character display process according to the third embodiment.

Next, an example of an enlarged character display process executed by the smartphone 1 of the third embodiment is described with reference to FIG. 9. FIG. 9 is a flowchart illustrating the example of the enlarged character display process of the third embodiment. Among the steps illustrated in FIG. 9, the steps that are the same as the steps of the enlarged character display process of the first embodiment illustrated in FIG. 3 are indicated with the same step numbers used in FIG. 3. Accordingly, the following description explains the enlarged character display process of the third embodiment, mainly, the steps of the enlarged character display process that are indicated with step numbers different from those of FIG. 3. Thus, redundant description of the first embodiment is omitted.

When the enlarged character display process of the third embodiment is started, an image is captured (Step S10). Then, character strings are extracted in units of rows by analyzing the layout of data of the image, and a center line of a row (ax+by+c=0) is extracted (Step S50). Then, when the user begins dragging, the position detection unit 104 stores the coordinates of the start position of the drag button 5 (Step S52). The coordinates of the start position of the drag button 5 is hereinafter indicated as "drag start point $(x_0, y_0)$".

Then, the display control unit 107 displays the designated row in the row display screen 3 (Step S14). Further, the display control unit 107 enlarges and displays the character string in the vicinity of the drag button 5 in the enlarged display screen 2 (Step S16). Further, the determination unit 106 determines that the completion action is not finished in a case where the return button is not yet pressed (Step S18). In this case, the position detection unit 104 detects the coordinates of the drag button 5 that is in the middle of moving (Step S54). The coordinates of the drag button 5 being in the middle of moving is hereinafter indicates as "drag mid-point (x, y)".

Then, the calculation unit 105 calculates the difference Δ of the distance from the drag start point $(x_0, y_0)$ to the drag middle point (x, y). Further, the determination unit 106 determines whether the calculated difference of distance Δ is greater than or equal to a predetermined threshold value (Step S56).

Next, the method of calculating the difference of distance Δ is described with reference to FIG. 10.

Figure 10:
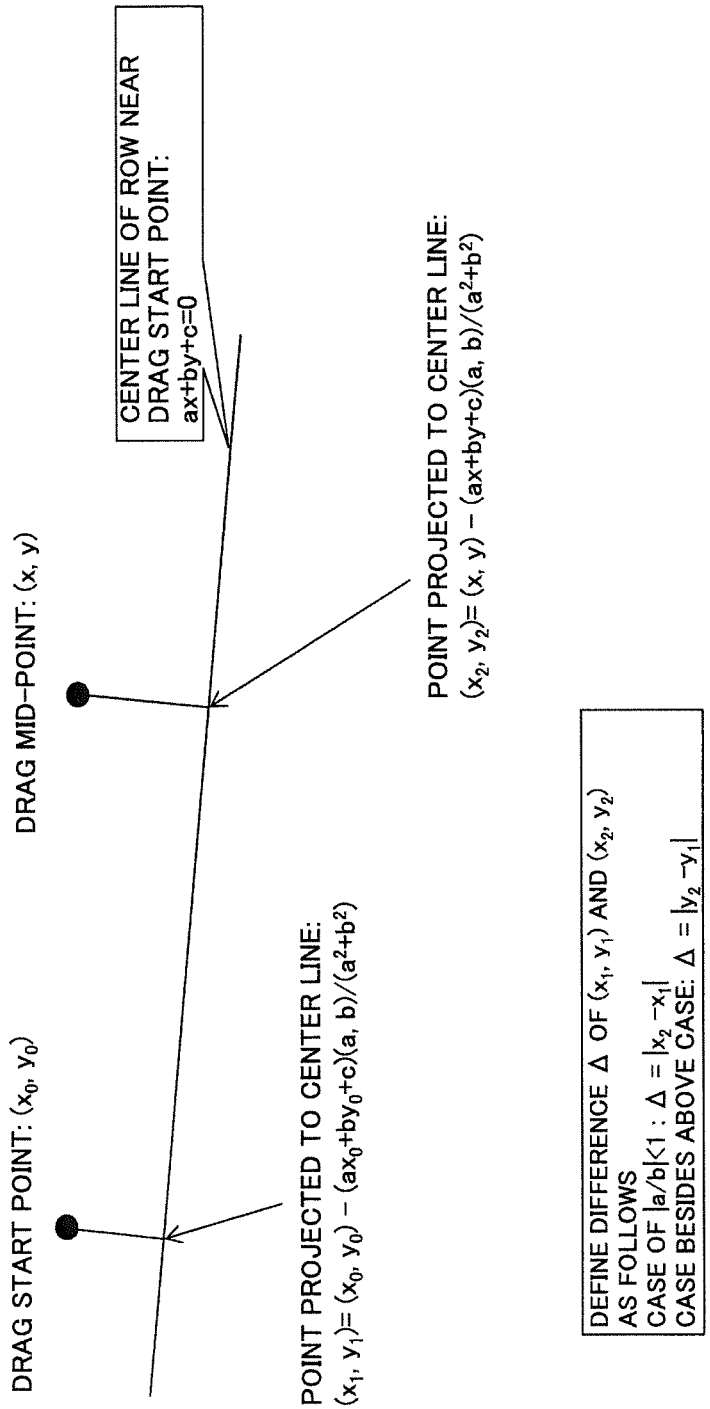
FIG. 10 is a diagram for explaining the displaying of an enlarged character according to the third embodiment.

FIG. 10 illustrates examples of the drag start point $(x_0, y_0)$, the drag middle point (x, y), and the center line (ax+by+c=0) of the row that is nearest to the drag start point $(x_0, y_0)$.

The following expression (1) illustrates a point $(x_1, y_1)$ projected from the drag start point ($(x_0, y_0)$) to the center line.

$$(x_1, y_1) = (x_0, y_0) - (ax_0 + by_0 + c)(a, b)/(a^2 + b^2) \quad (1)$$

The following expression (2) illustrates a point $(x_2, y_2)$ projected from the drag middle point ((x, y) to the center line.

$$(x_2, y_2) = (x, y) - (ax + by + c)(a, b)/(a^2 + b^2) \quad (2)$$

The difference Δ of the distance between the point $(x_1, y_1)$ projected from the drag start point $(x_0, y_0)$ to the center line and the point $(x_2, y_2)$ projected from the drag middle point ((x, y) to the center line is defined as follows.

In a case of |a/b|<1, the difference $\Delta = |x_2 - x_1|$

In a case of |a/b|≥1, the difference $\Delta = |y_2 - y_1|$

Figure 11:
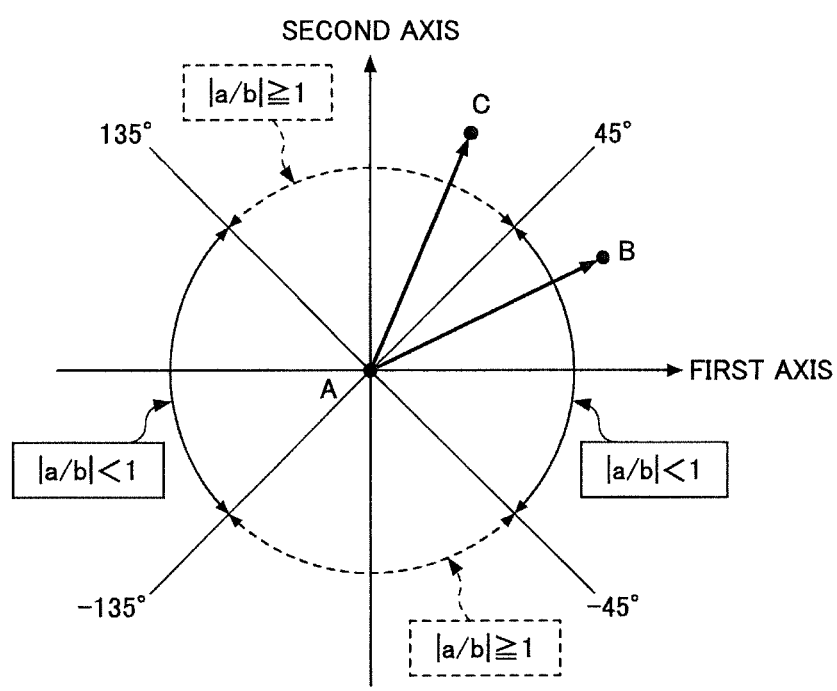
FIG. 11 is a diagram for explaining the displaying of an enlarged character according to the third embodiment.

The tilt of the center line (ax+by+c=0) is indicated as "−a/b" based on "y=−a/b·x−c/b". In a case where the slope of the center line is less than ±45 degrees with respect to the horizontal direction of the screen (first axis), "|a/b|<1" is satisfied as illustrated in FIG. 11. In order words, this is a case where the component of the first axis is greater than the component of the second axis in a case where the movement of the drag button 5 (e.g., dragging the drag button 5 from the position "A" to the position "B") is divided into the components of the first axis and the components of the second axis. Accordingly, in a case where "|a/b|<1" is satisfied, the calculation unit 105 uses an expression for calculating the difference of distance "$\Delta = |x_2 - x_1|$" to calculate the difference Δ of the distance in which the drag button 5 is moved in the first axis direction.

On the other hand, in a case where the slope of the center line is less than ±45 degrees, "|a/b|≥1" is satisfied. In other words, this is a case where the component of the second axis is greater than the component of the first axis such as a case where the drag button 5 is moved from the position "A" to the position "C". Thus, in this case where the drag button 5 is moved from the position "A" to the position "C", the calculation unit 105 calculates the difference Δ of the distance in which the drag button 5 is moved in the second axis direction based on the difference of distance "$\Delta = |y_2 - y_1|$".

Returning to FIG. 9, the determination unit 106 determines whether the calculated difference of distance Δ is greater than or equal to a predetermined threshold (Step S56). In a case where the determination unit 106 determines that the calculated difference of distance Δ is greater than or equal to the predetermined threshold, the display control unit 107 enlarges and displays a character string of the position of the drag button 5 (as the coordinates of a drag mid-point) and the vicinity of the position of the drag button 5. The position of the drag button 5 is the coordinates of a point $(x_2, y_2)$ projected to a center line from a drag mid-point (x, y).

Figure 12:
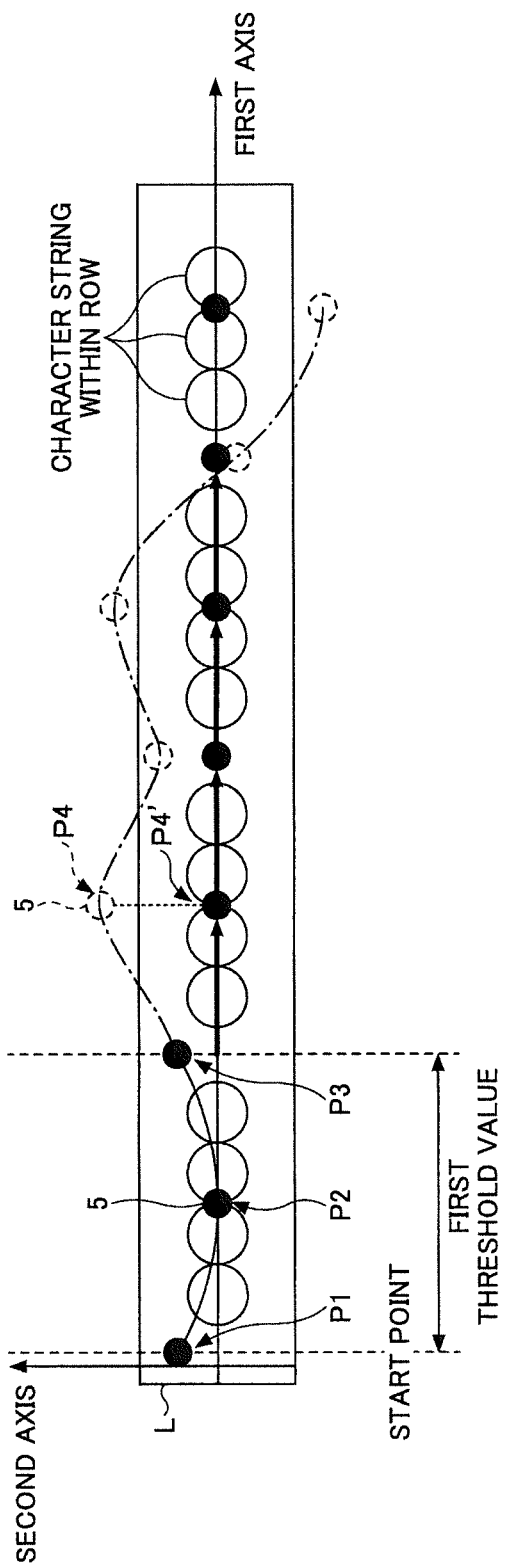
FIG. 12 is a diagram for explaining the displaying of an enlarged character according to the third embodiment.

For example, in a case where "|a/b|<1" is satisfied, the movement quantity from the drag start point to the drag mid-point is defined by the difference Δ in the first axis direction ($\Delta = |x_2 - x_1|$). The determination unit 106 determines whether the calculated differences Δ of distance ($= |x_2 - x_1|$) is greater than or equal to a first predetermined threshold (Step S56). In a case where the determination unit 106 determines that the calculated difference Δ of distance ($= |x_2 - x_1|$) is greater than or equal to a first predetermined threshold, the display control unit 107 enlarges and displays the character string of the drag mid-point (at which the drag button 5 is positioned) and the vicinity of the drag point by moving the drag button 5 in the first axis direction in the amount of the difference of the distance Δ from the drag start point to the drag button 5 in the first axis direction ($= |x_2 - x_1|$). For example, FIG. 12 illustrates a case where the first threshold is the difference Δ of the distance between the drag start point P1 and the drag mid-point P3 in the first axis direction when "|a/b|<1" is satisfied. In this case, the display control unit 107 moves the enlarged display area in the first axis direction in correspondence with the difference $\Delta(= |x_2 - x_1|)$ based on the x coordinates of the point $(x_2, y_2)$ at which the drag mid-point (x, y) projects to the center line of FIG. 10 (Step S60). Then, even if the position of the drag button 5 is moved to a position that does not satisfy "|a/b|<1" (e.g., point P4 in FIG. 12), the display control unit 107 moves the enlarged display area in the first axis direction in correspondence with the difference $\Delta(=|x_2-x_1|)$ based on the x coordinates of point $(x_2, y_2)$ until the designated position is released.

Thereby, even in a case where the user's dragging operation fluctuates as illustrated with a broken line in FIG. 12, the drag operation is valid only for the components in the first axis direction when the quantity of the movement of the drag operation is greater than or equal to the first threshold. For example, even in a case where the drag button 5 is positioned at the point P4, the position of point P4' and the vicinity of the position of point P4' are enlarged and displayed. Thereby, the position on the first axis and the vicinity of the position on the first axis are enlarged and displayed. Accordingly, with the enlarged display process of the third embodiment, erroneous operation of the enlarged display process can be prevented by stabilizing the movement of an area inside a row in response to the user's operation.

Note that the cases where the drag button 5 is moved to the end or the beginning of a designated row on the screen (as illustrated in Step S24 and S28 of FIG. 9) are examples of releasing the designated position. As for other examples (not illustrated in FIG. 9), the designated position may be determined to be released in a case where a finger is released from the drag button 5 on the screen. Further, the designated position may be determined to be released when a sliding finger that is contacting the drag button 5 on the screen is moved in a direction opposite to the sliding direction.

After the process of Step S60 in FIG. 9 is executed, the display control unit 107 enlarges and displays the character string of the position of the drag mid-point on the first axis and the vicinity of the drag mid-point (Step S16). Further, during a period when the return button is not pressed (Step S18), the processes in Steps S56 and after are repeated according to the position of the drag mid-point detected in Step S54.

Figure 13:
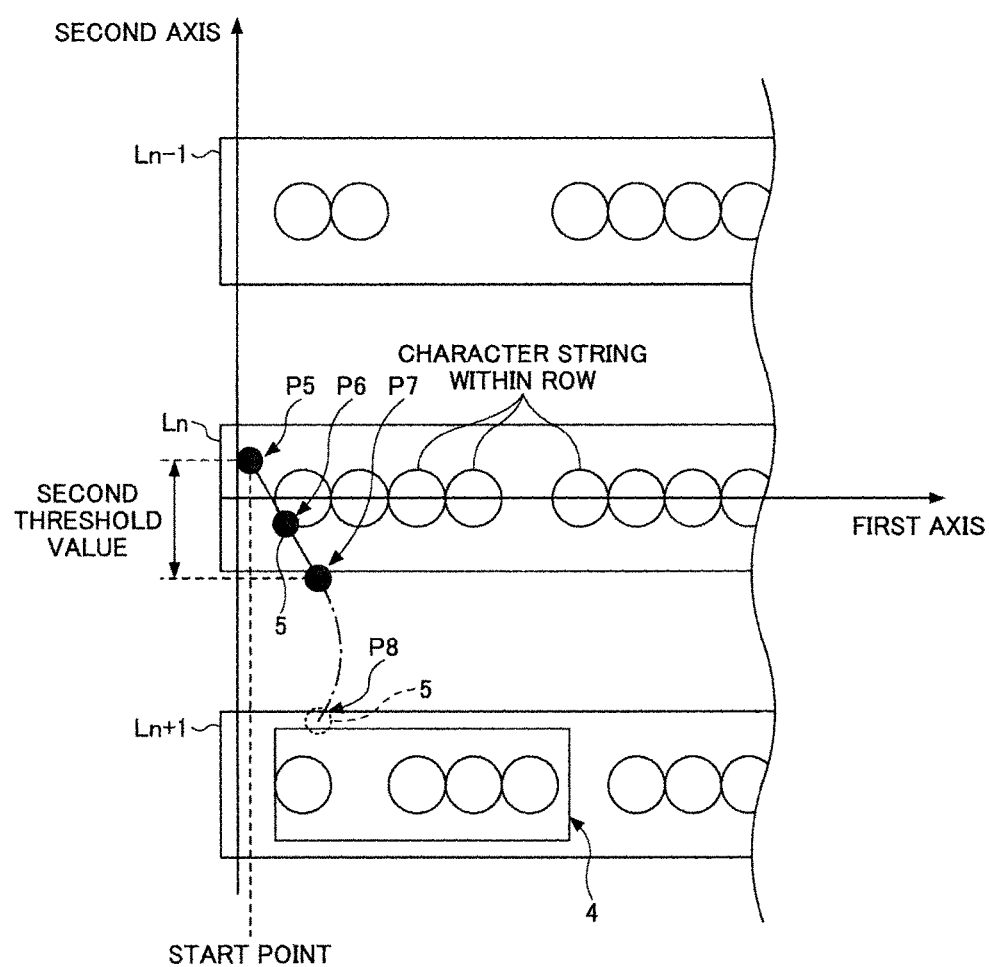
FIG. 13 is a diagram for explaining the displaying of an enlarged character according to the third embodiment.

On the other hand, in a case where "$|a/b| \geq 1$" is satisfied, the quantity of the movement from the drag start point to the drag mid-point is defined by the difference $\Delta$ of the distance in the second axis direction (direction orthogonal to the row direction) (="$|y_2-y_1|$"). The determination unit 106 determines whether the calculated difference $\Delta$ of distance (="$|y_2-y_1|$") is greater than or equal to a predetermined second threshold (Step S56). In a case where the determination unit 106 determines that the calculated difference $\Delta$ of distance (="$|y_2-y_1|$") is greater than or equal to the second threshold, the display control unit 107 identifies the row of the position of the drag button 5 when the drag button 5 is moved in a quantity of the difference $\Delta(=$"$|y_2-y_1|$") in the second axis direction and the vicinity of the position of the drag button 5. Further, the display control unit 107 enlarges and displays the character string of the beginning of the identified row and the vicinity of the beginning of the identified row. For example, in a case where "$|a/b| \geq 1$" is satisfied, the determination unit 106 determines that the difference $\Delta$ of the distance in the second axis direction when the drag button 5 is moved from the drag start point P5 to the drag mid-point P7 is greater than or equal to the second threshold as illustrated in FIG. 13. In the case where the difference $\Delta$ of the distance in the second axis direction when the drag button 5 is moved from the drag start point P5 to the drag mid-point P7 is greater than or equal to the second threshold, the display control unit 107 moves the display area in a distance (equivalent to the difference $\Delta$) in the second axis direction in correspondence with the difference $\Delta=$"$|y_2-y_1|$" based on the y coordinates of the point $(x_2, y_2)$ projected from the drag mid-point $(x, y)$ to the center line of FIG. 10. Then, the display control unit 107 enlarges and displays the character string of the beginning of the row of the position to which the display area is moved and the vicinity of the position to which the display area is moved (Step S60, S16). For example, in a case where the drag button 5 is moved to the point P8 in FIG. 13, the character string of the beginning of the subsequent row and the vicinity of the beginning of the subsequent row is enlarged and displayed.

Note that the character string of the beginning of the subsequent row and the vicinity of the beginning of the subsequent row may be enlarged and displayed in a case where the drag button 5 is moved to the point P8 of FIG. 13 and determined to be within a predetermined range with respect to the beginning of the subsequent row "Ln+1" (e.g., enlarged display area 4 with respect to the beginning of the row "Ln+1").

Further, during a period when the return button is not pressed (Step S18), the processes in Steps S14 and after are repeated according to the position of the drag mid-point detected in Step S54.

Hence, the example of an enlarged character display process executed by the smartphone 1 of the third embodiment has been described.

Note that, the determination unit 106 may determine whether the designated position has moved greater than or equal to the first threshold in the first axis direction indicating the row direction. In a case where the determination unit 106 determines that the designated position of the first axis direction has moved greater than or equal to the first threshold, the display control unit 107 may enlarge and display a character string of the designated position of the first axis direction within a designated row and the vicinity of the designated position of the first axis direction until the designation of the designated position is released.

[Example of Effects]

In a case where character strings are displayed in narrowly spaced rows, a fingertip may vertically wobble when tracing a target position for enlarging and displaying a character string in a certain row. Thus, a character string positioned above or below the certain row may be unintentionally enlarged and displayed.

In contrast, with the enlarged character display process of the third embodiment, the position to be enlarged and displayed can be prevented from being inadvertently designated when enlarging and displaying a character string.

More specifically, with the enlarged character display process of the third embodiment, a character string can be extracted in, units of rows, from a character area of a screen. Then, it is determined whether a row designated to be enlarged and displayed by the user is in the midst of being enlarged and displayed based on the comparison between the quantity of the movement of a dragging operation and the first or the second threshold. In a case where a certain row is determined to be in the midst of being enlarged and displayed according to the third embodiment, the row designated to be enlarged and displayed is controlled, so that the row designated to be enlarged and displayed does not change even if the position designated to be enlarged and displayed is moved to an area above or below the certain row that is in the midst of being enlarged and displayed. Thereby, the position to be enlarged and displayed can be prevented from being inadvertently designated due to wobbling of a fingertip when enlarging and displaying a character string. Further, the third embodiment can attain the same effects as the above-described effects attained by the first and second embodiments.

[Displaying in Units of Words]

Similar to the first and second embodiments, the display control unit 107 may enlarge and display a character string of a designated position and the vicinity of the designated position in units of words. Accordingly, as a finger is being moved along the row direction, an enlarged character string is displayed in the enlarged display screen 2 in units of words. Thereby, a word can be prevented from being displayed in an intermitted state. Thus, the enlarged character string can be displayed in a state that is easily recognizable for the user.

With the above-described embodiments of the present invention, the designation of a position of a beginning of an adjacent row during the enlarging and displaying of a character string can be facilitated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the terminal device, the display control method, and the non-transitory computer-readable recording medium according to the embodiments of the present invention have been described in detail, it should be understood that the various changes, substitutions, and alterations could be made hereto without departing from the spirit and scope of the invention.

Figure 14B:
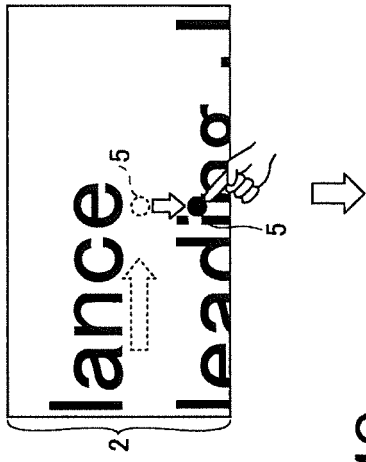
FIGS. 14A-14C are diagrams illustrating an example of the displaying of an enlarged character according to a modified example.
Figure 14C:
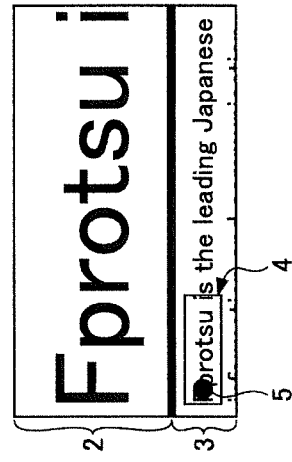
Figure 14A:
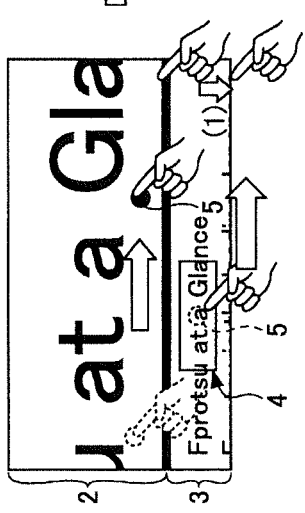

For example, in the above-described embodiments, a screen is divided into two areas in which one area displays an entire row and another area displays an enlarged target character string of a designated row. Alternatively, the screen need not be divided, so that an enlarged target character string of a designated row is displayed in an entire single screen. For example, as illustrated in FIG. 14A, the enlarged display screen 2 may be formed into a single screen (see FIG. 14B) by touching a border of two divided screens with a finger and lowering the finger (see (1) of FIG. 14A). In this case, the user performs the dragging operation by using the enlarged display screen 2. Further, as illustrated in FIG. 14C, a screen may be further divided into two areas that are the row display screen 3 and the enlarged display screen 2.

As illustrated in FIG. 14A, the dragging operation may be performed on the row display screen 3 when the screen is divided into two screens or performed on the enlarged display screen 2.

Although the above-described embodiments are explained with an example in which the drag button 5 is displayed for identifying the designated position, the drag button 5 does not necessarily need to be displayed.

Although the above-described embodiments are explained with an example in which the character string is written horizontally, the character string may be written vertically, that is, the embodiments may be applied to a character string in which the first axis is the vertical direction.

What is claimed is:

1. A terminal device comprising:
a processor that executes a process including
extracting a plurality of character strings, in units of rows, from a character area included in an image data,
detecting movement of a position of a drag button on a first screen of a touch panel in accordance with a drag operation by a user, the drag button on the first screen indicating designation of a position in a designated row among the rows of the extracted character strings,
determining whether a subsequent row succeeding the designated row exists, when the designation of the position in the designated row is released,
determining whether the position of the drag button is moved to an end of the designated row, when the designation of the position in the designated row is not released,
moving a beginning of a view area on the first screen to a beginning of the subsequent row in response to a determination that the subsequent row exists, and
enlarging and displaying a character string at the beginning of the subsequent row and in the vicinity of the beginning of the subsequent row on a second screen of the touch panel after the beginning of the view area on the first screen is moved to the beginning of the subsequent row,
wherein the moving includes,
in response to a determination that the position of the drag button when the designation of the position in the designated row is not released, is moved to the end of the designated row,
moving the beginning of the view area on the first screen to the beginning of the subsequent row.

2. The terminal device as claimed in claim 1,
wherein the enlarging and displaying includes,
in response to a determination that the position of the drag button, when the designation of the position in the designated row is not released, is moved to the end of the designated row,
enlarging and displaying the character string at the beginning of the subsequent row and in the vicinity of the beginning of the subsequent row on the second screen after the beginning of the view area on the first screen is moved to the beginning of the subsequent row.

3. The terminal device as claimed claim 1,
wherein the determining whether the subsequent row succeeding the designated row exists includes
determining whether the position designated in the designated row is moved by a distance greater than or equal to a first threshold in a first axis direction, the first axis direction indicating a row direction, and
wherein the enlarging and displaying includes
in response to a determination that the position designated in the designated row is moved by the distance greater than or equal to the first threshold value in the first axis direction,
enlarging and displaying a character string at the position designated in the designated row and in the vicinity of the position designated in the designated row on the second screen until the designation of the designated position is released.

4. The terminal device as claimed in claim 1,
wherein the enlarging and displaying includes
enlarging and displaying a character string at the position designated in the designated row and in the vicinity of the position designated in the designated row on the second screen in units of words of the designated row.

5. The terminal device as claimed claim 1,
wherein the determining whether the subsequent row succeeding the designated row exists includes
determining whether the position designated in the designated row is moved within a predetermined range from the beginning of the subsequent row after the designation of the position is released in response to a determination that the subsequent row exists, wherein the enlarging and displaying includes in response to a determination that the position designated in the designated row is moved within the predetermined range from the beginning of the subsequent row, enlarging and displaying the character string at the beginning of the subsequent row and in the vicinity of the beginning of the subsequent row on the second screen.

6. A display control method for causing a computer to execute a process comprising:

extracting a plurality of character strings, in units of rows, from a character area included in an image data;

detecting movement of a position of a drag button on a first screen of a touch panel in accordance with a drag operation by a user, the drag button on the first screen indicating designation of a position in a designated row among the rows of the extracted character strings;

determining whether a subsequent row succeeding the designated row exists, when the designation of the position in the designated row is released;

determining whether the position of the drag button is moved to an end of the designated row, when the designation of the position in the designated row is not released;

moving a beginning of a view area on the first screen to a beginning of the subsequent row in response to a determination that the subsequent row exists; and enlarging and displaying a character string at the beginning of the subsequent row and in the vicinity of the beginning of the subsequent row on a second screen of the touch panel after the beginning of the view area on the first screen is moved to the beginning of the subsequent row;

wherein the moving includes, in response to a determination that the position of the drag button, when the designation of the position in the designated row is not released, is moved to the end of the designated row, moving the beginning of the view area on the first screen to the beginning of the subsequent row.

7. The display control method as claimed in claim 6, wherein the enlarging and displaying includes, in response to a determination that the position of the drag button, when the designation of the position in the designated row is not released, is moved to the end of the designated row, enlarging and displaying the character string at the beginning of the subsequent row and in the vicinity of the beginning of the subsequent row on the second screen after the beginning of the view area on the first screen is moved to the beginning of the subsequent row.

8. The display control method as claimed in claim 6, wherein the determining whether the subsequent row succeeding the designated row exists includes determining whether the position designated in the designated row is moved by a distance greater than or equal to a first threshold in a first axis direction, the first axis direction indicating a row direction, and wherein the enlarging and displaying includes in response to a determination that the position designated in the designated row is moved by the distance greater than or equal to the first threshold value in the first axis direction, enlarging and displaying a character string at the position designated in the designated row and in the vicinity of the position designated in the designated row on the second screen until the designation of the designated position is released.

9. The display control method as claimed claim 6, wherein the enlarging and displaying includes enlarging and displaying a character string at the position designated in the designated row and in the vicinity of the position designated in the designated row on the second screen in units of words of the designated row.

10. The display control method as claimed in claim 6, wherein the determining includes determining whether the position designated in the designated row is moved within a predetermined range from the beginning of the subsequent row after the designation of the position is released in response to a determination that the subsequent row exists, wherein the enlarging and displaying includes in response to a determination that the position designated in the designated row is moved within the predetermined range from the beginning of the subsequent row, enlarging and displaying the character string at the beginning of the subsequent row and in the vicinity of the beginning of the subsequent row on the second screen.

11. A non-transitory computer-readable recording medium storing a program that causes a processor of a terminal device to execute a process, the process comprising:

extracting a plurality of character strings, in units of rows, from a character area included in an image data;

detecting movement of a position of a drag button on a first screen of a touch panel in accordance with a drag operation by a user, the drag button on the first screen indicating designation of a position in a designated row among the rows of the extracted character strings;

determining whether a subsequent row succeeding the designated row exists, when the designation of the position in the designated row is released;

determining whether the position of the drag button is moved to an end of the designated row, when the designation of the position in the designated row is not released;

moving a beginning of a view area on the first screen to a beginning of the subsequent row in response to a determination that the subsequent row exists; and enlarging and displaying a character string at the beginning of the subsequent row and in the vicinity of the beginning of the subsequent row on a second screen of the touch panel after the beginning of the view area on the first screen is moved to the beginning of the subsequent row;

wherein the moving includes, in response to a determination that the position of the drag button, when the designation of the position in the designated row is not released, is moved to the end of the designated row, moving the beginning of the view area on the first screen to the beginning of the subsequent row.

12. The non-transitory computer-readable recording medium as claimed in claim 11, wherein the enlarging and displaying includes, in response to a determination that the position of the drag button, when the designation of the position in the designated row is not released, is moved to the end of the designated row, enlarging and displaying the character string at the beginning of the subsequent row and in the vicinity of the beginning of the subsequent row on the second screen after the beginning of the view area on the first screen is moved to the beginning of the subsequent row.

13. The non-transitory computer-readable recording medium as claimed in claim 11,
wherein the determining whether the subsequent row succeeding the designated row exists executed by the processor includes
determining whether the position designated in the designated row is moved by a distance greater than or equal to a first threshold in a first axis direction, the first axis direction indicating a row direction, and
wherein the enlarging and displaying includes
in response to a determination that the position designated in the designated row is moved by the distance greater than or equal to the first threshold value in the first axis direction,
enlarging and displaying a character string at the position designated in the designated row and in the vicinity of the position designated in the designated row on the second screen until the designation of the designated position is released.

14. The non-transitory computer-readable recording medium as claimed in claim 11,
wherein the enlarging and displaying includes
enlarging and displaying a character string at the position designated in the designated row and in the vicinity of the position designated in the designated row on the second screen in units of words of the designated row.

15. The non-transitory computer-readable recording medium as claimed in claim 11,
wherein the determining whether the subsequent row succeeding the designated row exists includes
determining whether the position designated in the designated row is moved within a predetermined range from the beginning of the subsequent row after the designation of the position is released in response to a determination that the subsequent row exists,
wherein the enlarging and displaying includes
in response to a determination that the position designated in the designated row is moved within the predetermined range from the beginning of the subsequent row,
enlarging and displaying the character string at the beginning of the subsequent row and in the vicinity of the beginning of the subsequent row on the second screen.

* * * * *